(12) United States Patent
Zhang et al.

(10) Patent No.: US 12,490,271 B2
(45) Date of Patent: Dec. 2, 2025

(54) FD MODE DEPENDENT UCI MULTIPLEXING

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Greentown, PA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 18/655,153

(22) Filed: May 3, 2024

(65) Prior Publication Data

US 2024/0292421 A1 Aug. 29, 2024

Related U.S. Application Data

(62) Division of application No. 18/149,435, filed on Jan. 3, 2023, now Pat. No. 12,004,165, which is a division
(Continued)

(51) Int. Cl.
*H04W 72/21* (2023.01)
*H04B 7/06* (2006.01)
(Continued)

(52) U.S. Cl.
CPC .......... *H04W 72/21* (2023.01); *H04B 7/0696* (2023.05); *H04L 5/14* (2013.01);
(Continued)

(58) Field of Classification Search
CPC . H04W 72/21; H04W 56/001; H04W 72/046; H04W 72/53; H04W 74/0833;
(Continued)

(56) References Cited

U.S. PATENT DOCUMENTS 11,012,204 B2 * 5/2021 Yi ............................. H04L 5/14
11,540,259 B2 * 12/2022 Li .......................... H04W 72/04
(Continued)

FOREIGN PATENT DOCUMENTS

WO 2020092264 A1 5/2020

OTHER PUBLICATIONS

International Preliminary Report on Patentability—PCT/US2021/061668—The International Bureau of WIPO—Geneva, Switzerland—Jun. 15, 2023.
(Continued)

*Primary Examiner* — Harry H Kim
(74) *Attorney, Agent, or Firm* — Procopio, Cory, Hargreaves & Savitch LLP

(57) ABSTRACT

Apparatus, methods, and computer program products for PHY priority for wireless communications are provided. An example apparatus may multiplex a first uplink control information transmission based on a first uplink control information resource and a second uplink control information transmission based on a second uplink control information resource that overlaps in time with the first uplink control information resource, at least one of the first uplink control information resource and the second uplink control information resource being for full-duplex communication. The example apparatus may determine, based on applying a multiplexing rule on the full-duplex communication, whether to use the first uplink control information resource associated with a first beam or the second uplink control information resource associated with a second beam. The example apparatus may transmit a multiplexed uplink control information transmission using a determined uplink control information resource based on the multiplexing rule.

9 Claims, 10 Drawing Sheets

Related U.S. Application Data of application No. 17/112,908, filed on Dec. 4, 2020, now Pat. No. 11,570,764.

(51) Int. Cl.

| | |
|---|---|
| *H04L 5/14* | (2006.01) |
| *H04L 5/16* | (2006.01) |
| *H04W 56/00* | (2009.01) |
| *H04W 72/044* | (2023.01) |
| *H04W 72/20* | (2023.01) |
| *H04W 72/53* | (2023.01) |
| *H04W 74/0833* | (2024.01) |

(52) U.S. Cl.
CPC ....... *H04W 56/001* (2013.01); *H04W 72/046* (2013.01); *H04W 72/53* (2023.01); *H04W 74/0833* (2013.01)

(58) Field of Classification Search
CPC ........ H04W 72/20; H04B 7/0695; H04L 5/14; H04L 5/0023; H04L 5/1461; H04L 5/16; H04L 5/0053
See application file for complete search history.

(56) References Cited

U.S. PATENT DOCUMENTS

| | | |
|---|---|---|
| 11,570,764 B2 | 1/2023 | Zhang et al. |
| 2016/0308662 A1 | 10/2016 | Li et al. |
| 2018/0132264 A1 | 5/2018 | Jung et al. |
| 2019/0007941 A1 | 1/2019 | Cavalcanti et al. |
| 2019/0347205 A1* | 11/2019 | Anderson ........... G06F 12/0895 |
| 2019/0357205 A1* | 11/2019 | Li ........................ H04B 7/0695 |
| 2019/0364561 A1 | 11/2019 | Xiong et al. |
| 2021/0021399 A1 | 1/2021 | Liu et al. |
| 2021/0037555 A1* | 2/2021 | Papasakellariou .... H04L 1/0026 |
| 2021/0250134 A1 | 8/2021 | Islam et al. |
| 2021/0400637 A1 | 12/2021 | Abotabl et al. |
| 2022/0182160 A1 | 6/2022 | Su et al. |
| 2022/0182999 A1 | 6/2022 | Zhang et al. |
| 2023/0148182 A1 | 5/2023 | Zhang et al. |
| 2023/0170948 A1 | 6/2023 | Han et al. |

OTHER PUBLICATIONS

International Search Report and Written Opinion—PCT/US2021/061668—ISA/EPO—Apr. 8, 2022.

\* cited by examiner

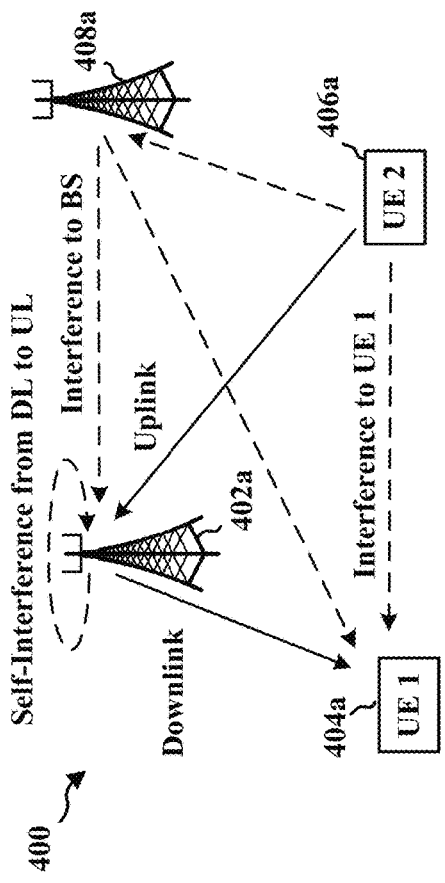
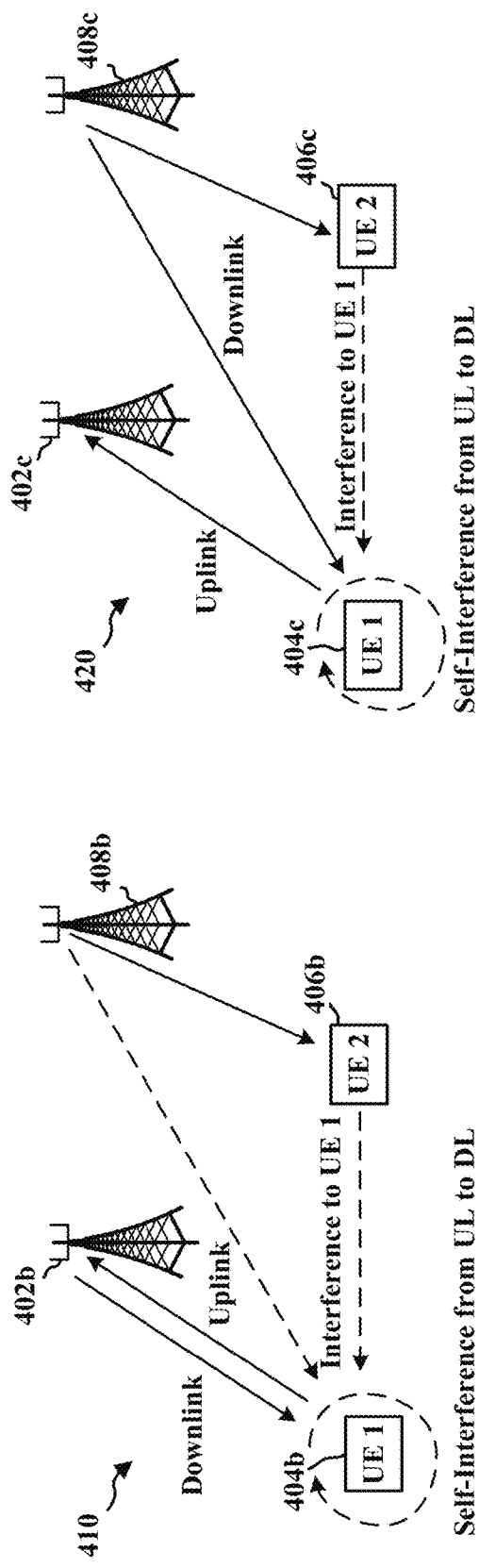
FIG. 4A
FIG. 4B
FIG. 4C

FD MODE DEPENDENT UCI MULTIPLEXING

CROSS-REFERENCE TO RELATED APPLICATION(S)

This application is a divisional application of U.S. Non-provisional application Ser. No. 18/149,435, entitled "FD MODE DEPENDENT UCI MULTIPLEXING" and filed on Jan. 3, 2023, which is a divisional application of U.S. Non-provisional application Ser. No. 17/112,908, entitled "FD MODE DEPENDENT UCI MULTIPLEXING" and filed on Dec. 4, 2020, each of which is expressly incorporated by reference herein in their entirety.

BACKGROUND

Technical Field

The present disclosure relates generally to communication systems, and more particularly, to a wireless communication system with full-duplex (FD) communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The UE multiplexes a first uplink control information transmission based on a first uplink resource and a second uplink control information transmission based on a second uplink resource that overlaps in time with the first uplink resource, at least one of the first uplink resource and the second uplink resource being for full-duplex communication. The UE determines, based on applying a multiplexing rule on the full-duplex communication, whether to use the first uplink resource associated with a first beam or the second uplink resource associated with a second beam. The UE transmits a multiplexed uplink control information transmission using a determined uplink resource based on the multiplexing rule.

In another aspect of the disclosure, a method, a computer-readable medium, and an apparatus at a base station are provided. The base station determines, based on applying a multiplexing rule on a full-duplex communication to determine an uplink beam to receive a multiplexed uplink control information transmission of a first uplink control information transmission associated with a first uplink beam and a second uplink control information transmission associated with a second uplink beam, at least one of a first uplink resource for the first uplink control information transmission and a second uplink resource for the second uplink control information transmission being for the full-duplex communication. The base station receives the multiplexed uplink control information transmission using the determined beam based on the multiplexing rule.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 4A, 4B, and 4C illustrate example diagrams of full-duplex wireless communication.

DETAILED DESCRIPTION

Figure 1:
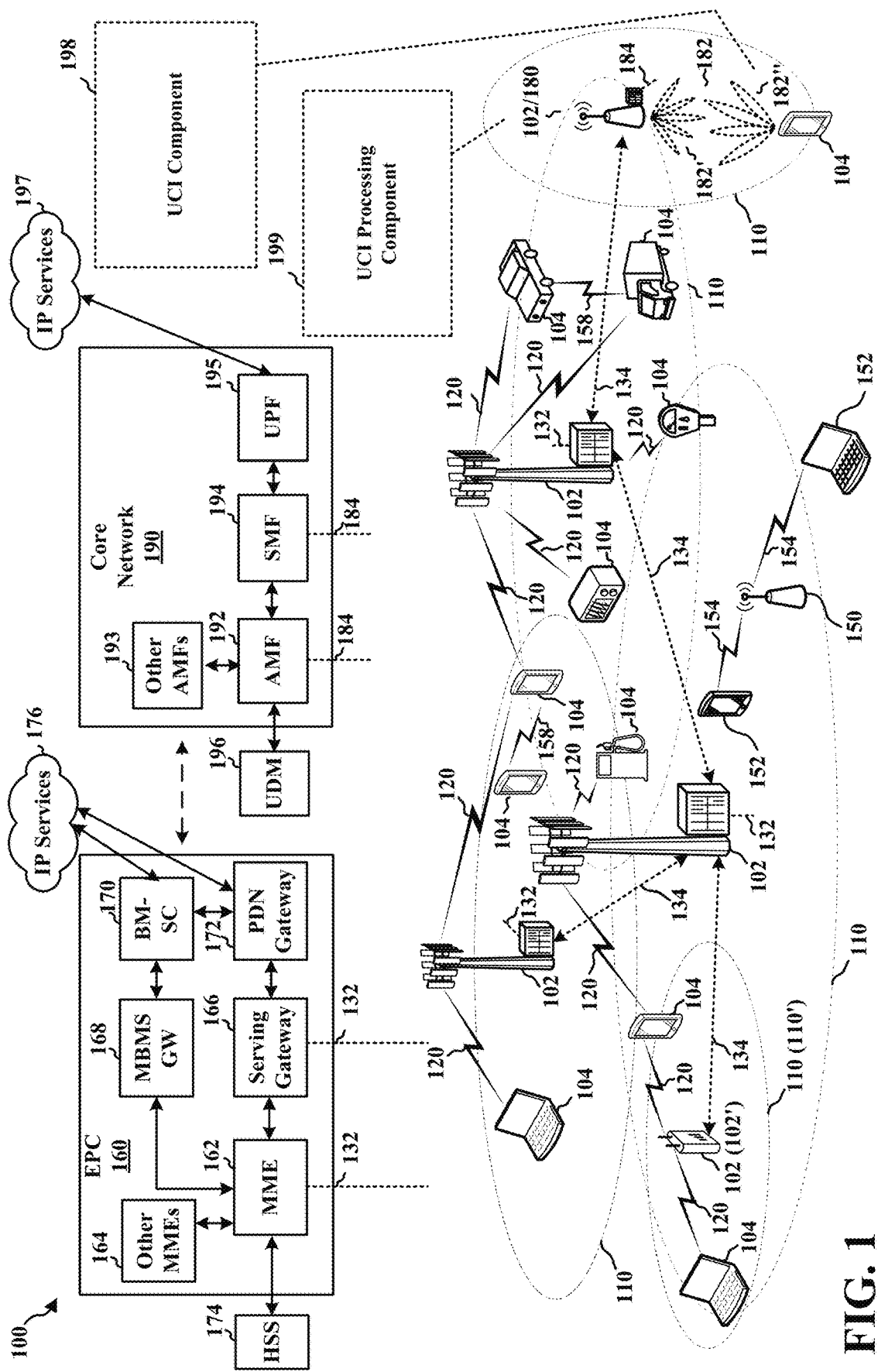
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A user equipment (UE) and/or a base station may communicate in a full-duplex mode in which uplink communication and downlink communication is exchanged at overlapping times in a same or partially overlapped or separate frequency bands. The UE and the base station may exchange communication using one or more directional downlink (DL) and uplink (UL) beam pairs. In some wireless communication systems, there may be co-existing half-duplex (HD) and full-duplex (FD) transmissions. Full-duplex operation may enable reception DL signal in previously UL only slots, which may in turn enable latency reduction. In addition, full-duplex transmissions may improve spectrum efficiency per cell and per UE.

In some wireless communication systems, there are multiplexing rules for overlapping uplink control information (UCI) transmissions. The multiplexing rules may be applicable to cases where a UE has resources for physical uplink control channel (PUCCH) transmissions or for PUCCH and physical uplink shared channel (PUSCH) transmissions that overlap in time. For example, if there are two overlapping UCI transmissions, one for scheduling request (SR) and another one for hybrid automatic repeat request acknowledgment (HARQ-ACK) information, the multiplexing rule may indicate for the UE to multiplex both UCIs to the UCI resource that carries HARQ-ACK information if the UE is provided with a simultaneous HARQ-ACK channel state information (e.g., simultaneousHARQ-ACK-CSI). In another example, if a single PUCCH resource from the HARQ-ACK (and/or the SR resource) and two PUCCH resources with CSI reports are present, the rule may indicate for the UE to multiplex the HARQ-ACK information (and/or the SR) in the resource for the PUCCH transmission with the CSI report having the higher priority. The UE may refrain from transmitting the PUCCH with the CSI report having the lower priority.

For full-duplex operations, for example, an UL beam associated with the multiplexed UCI resource may be unpaired with a DL beam for full-duplex communication that involves uplink transmission and downlink reception that overlap in time. Aspects provided herein enable a UE and a base station to resolve and/or avoid such unpaired beam issues for UCI resources.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a UCI component 198. In some aspects, the UCI component 198 may be configured to multiplex a first uplink control information transmission based on a first uplink resource and a second uplink control information transmission based on a second uplink resource that overlaps in time with the first uplink resource, at least one of the first uplink resource and the second uplink resource being for full-duplex communication. In some aspects, the UCI component 198 may be configured to determine, based on applying a multiplexing rule on the full-duplex communication, whether to use the first uplink resource associated with a first beam or the second uplink resource associated with a second beam. In some aspects, the UCI component 198 may be configured to transmit a multiplexed uplink control information transmission using a determined uplink resource based on the multiplexing rule. In some aspects, the base station 180 may include a UCI processing component 199. In some aspects, the UCI processing component 199 may be configured to determine, based on applying a multiplexing rule on a full-duplex communication to determine an uplink beam to receive a multiplexed uplink control information transmission of a first uplink control information transmission associated with a first uplink beam and a second uplink control information transmission associated with a second uplink beam, at least one of a first uplink resource for the first uplink control information transmission and a second uplink resource for the second uplink control information transmission being for the full-duplex communication. In some aspects, the UCI processing component 199 may be configured to receive the multiplexed uplink control information transmission using the determined beam based on the multiplexing rule.

Although the following description may be focused on 5G NR, the concepts described herein may be applicable to other similar areas, such as LTE, LTE-A, CDMA, GSM, and other wireless technologies.

Figure 2:
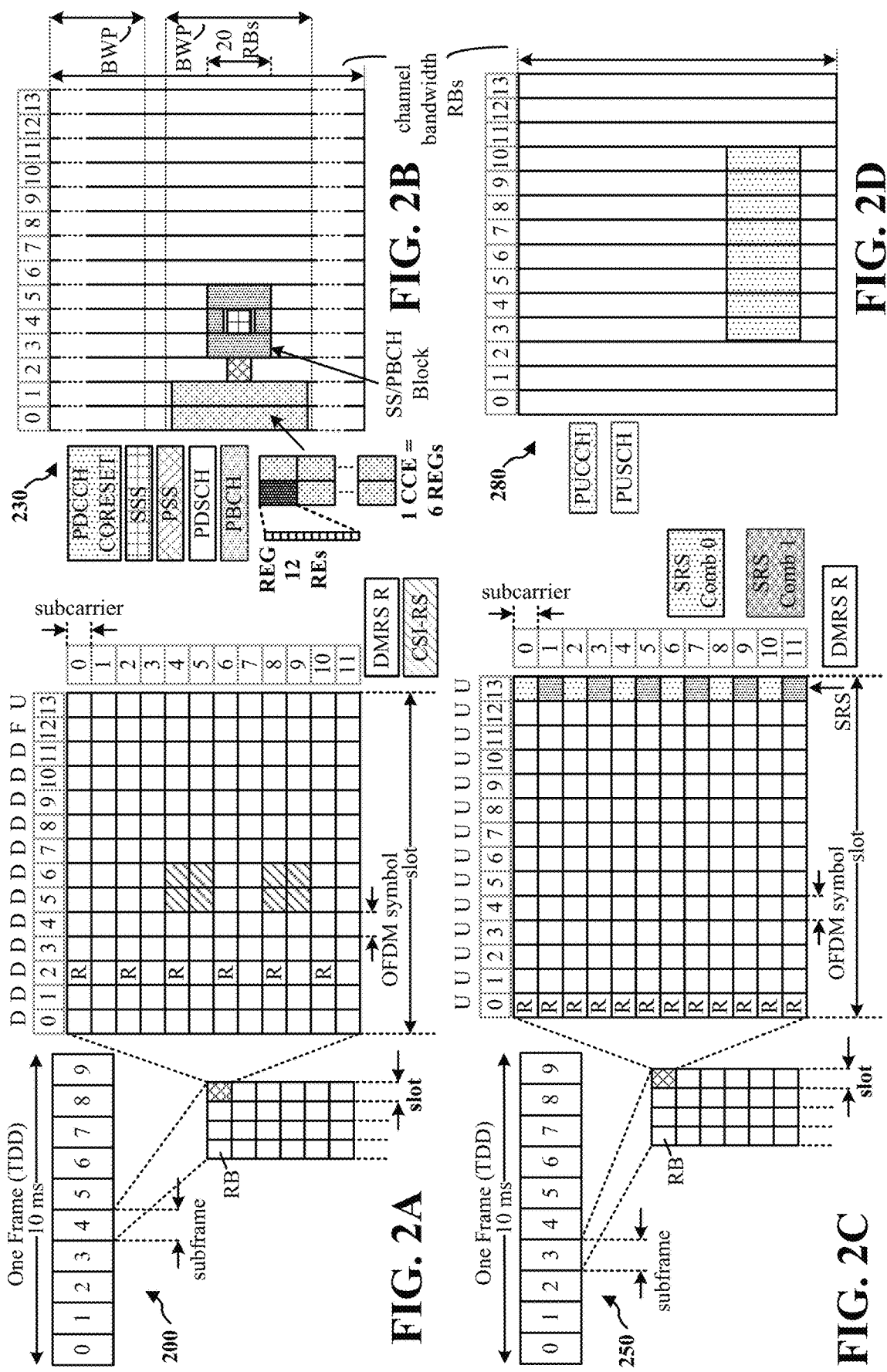
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to, $2^\mu*15$ kHz, where is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
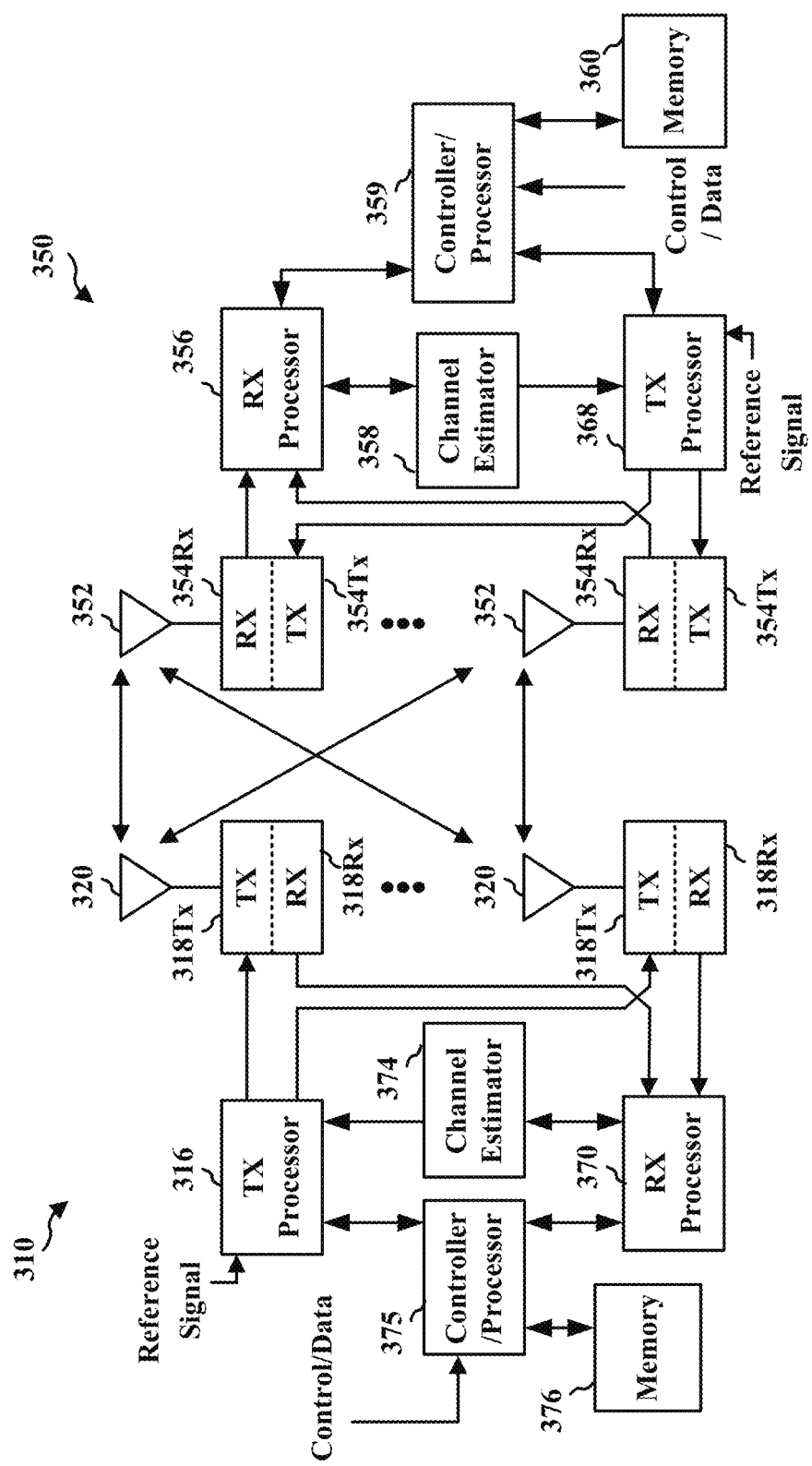
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate an RF carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with UCI component 198 of FIG. 1.

At least one of the TX processor 316, the RX processor 370, and the controller/processor 375 may be configured to perform aspects in connection with UCI processing component 199 of FIG. 1.

Wireless communication systems may be configured to share available system resources and provide various telecommunication services (e.g., telephony, video, data, messaging, broadcasts, etc.) based on multiple-access technologies that support communication with multiple users. Full-duplex operation in which a wireless device exchanges uplink and downlink communication that overlaps in time may enable more efficient use of the wireless spectrum. Full-duplex operation may include simultaneous transmission and reception in a same frequency range, or partially overlapped frequency range, or separate frequency ranges. In some examples, the frequency range may be a mmW frequency range, e.g., frequency range 2 (FR2). In some examples, the frequency range may be a sub-6 GHz frequency range, e.g., frequency range 1 (FR1). The aspects presented herein may also be applied to other frequency ranges. Full-duplex capability may be supported at a base station and/or a UE. For example, a UE may transmit uplink communication from one antenna panel and may receive downlink communication with another antenna panel. For another example, a base station may transmit to one UE from one antenna panel and may receive from another UE with another antenna panel. For another example, a base station may transmit to one UE from one antenna panel and may receive from the same UE with another antenna panel. In some examples, the full-duplex communication may be conditional on beam or spatial separation or other conditions.

Full-duplex communication may reduce latency. For example, full-duplex operation may enable a UE to receive a downlink signal in an uplink only slot, which can reduce the latency for the downlink communication. Full-duplex communication may improve spectrum efficiency, e.g., spectrum efficiency per cell or per UE. Full-duplex communication may enable more efficient use of wireless resources.

FIGS. 4A-4C illustrate various modes of full-duplex communication. Full-duplex communication supports transmission and reception of information over a same frequency band, or partially overlapped frequency band, or separate frequency bands in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full-duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full-duplex communication 400 in which a first base station 402a is in full-duplex communication with a first UE 404a and a second UE 406a. The first base station 402a is a full-duplex base station, whereas the first UE 404a and the second UE 406a may be configured as either a half-duplex UE or a full-duplex UE. The second UE 406a may transmit a first uplink signal to the first base station 402a as well as to other base stations, such as a second base station 408a in proximity to the second UE 406a. The first base station 402a transmits a downlink signal to the first UE 404a concurrently with receiving the uplink signal from the second UE 406a. The base station 402a may experience self-interference from the receiving antenna that is receiving the uplink signal from UE 406a receiving some of the downlink signal being transmitted to the UE 404a. The base station 402a may experience additional interference due to signals from the second base station 408a. Interference may also occur at the first UE 404a based on signals from the second base station 408a as well as from uplink signals from the second UE 406a.

FIG. 4B shows a second example of full-duplex communication 410 in which a first base station 402b is in full-duplex communication with a first UE 404b. In this example, the first base station 402b is a full-duplex base station and the first UE 404b is a full-duplex UE. The first base station 402b and the UE 404b that can concurrently receive and transmit communication that overlaps in time in a same frequency band. The base station and the UE may each experience self-interference, in which a transmitted signal from the device is leaked to a receiver at the same device. The first UE 404b may experience additional interference based on one or more signals emitted from a second UE 406b and/or a second base station 408b in proximity to the first UE 404b.

FIG. 4C shows a third example of full-duplex communication 420 in which a first UE 404c is a full-duplex UE in communication with a first base station 402c and a second base station 408c. The first base station 402c and the second base station 408c may serve as multiple transmission and reception points (multi-TRPs) for UL and DL communication with the UE 404c. The second base station 408c may be in communication with a second UE 406c. In FIG. 4C, the first UE 404c may concurrently transmit an uplink signal to the first base station 402c while receiving a downlink signal from the second base station 408c. The first UE 404c may experience self-interference as a result of the first signal and the second signal being communicated simultaneously, e.g., the uplink signal may leak to, e.g., be received by, the UE's receiver. The first UE 404c may experience additional interference from the second UE 406c.

Figure 5:
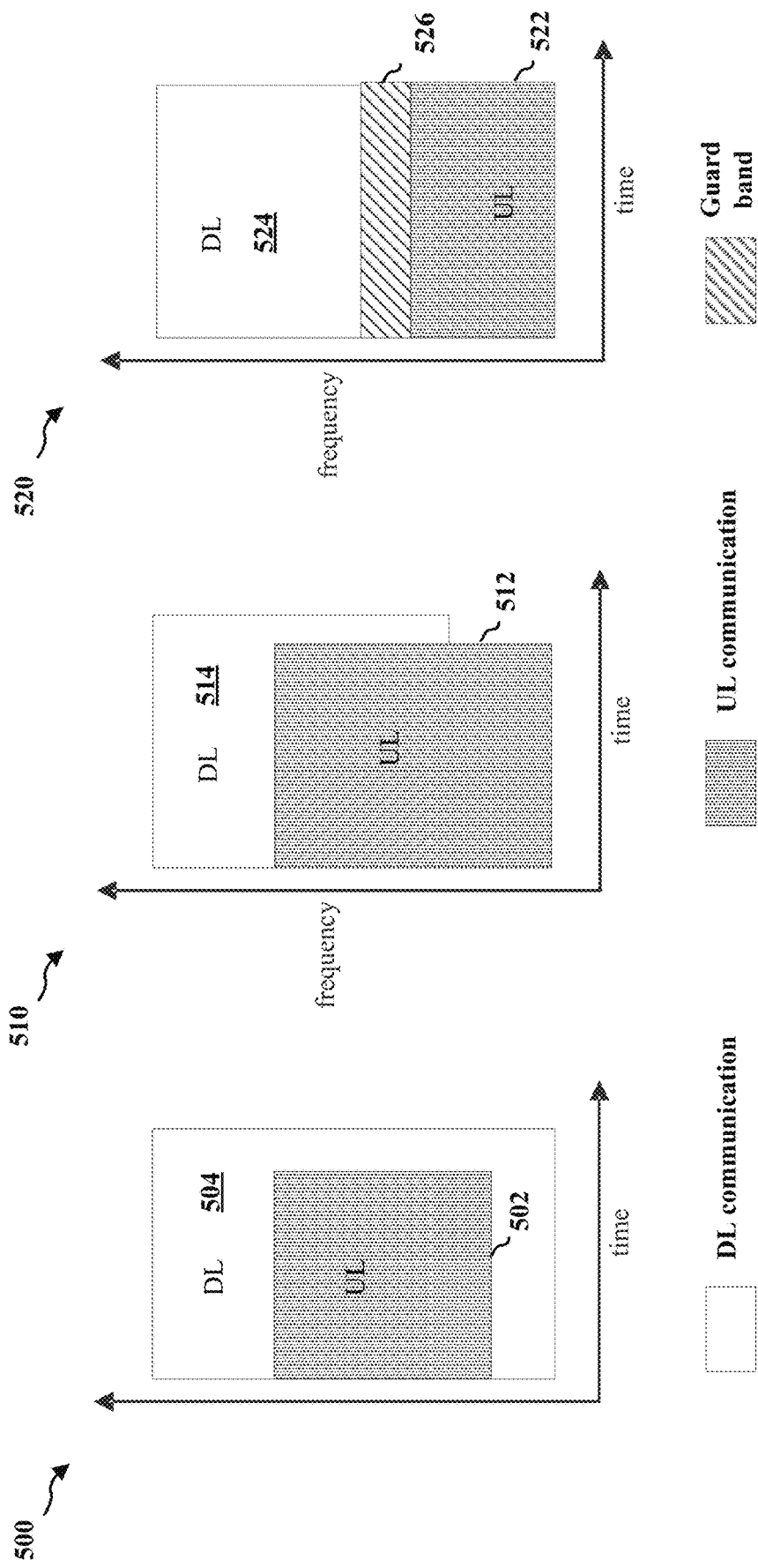
FIG. 5 illustrates examples of in-band full-duplex (IBFD) resources and sub-band frequency division duplex (FDD) resources for full-duplex communication.

Full-duplex communication may be in a same frequency band. The uplink and downlink communication may be in different frequency subbands, in the same frequency subband, or in partially overlapping frequency subbands. FIG. 5 illustrates a first example 500 and a second example 510 of in-band full-duplex (IBFD) resources and a third example 520 of sub-band full-duplex resources. In IBFD, signals may be transmitted and received in overlapping times and overlapping in frequency. As shown in the first example 500, a time and a frequency allocation of a UL resources 502 may fully overlap with a time and a frequency allocation of DL resources 504. In the second example 510, a time and a frequency allocation of UL resources 512 may partially overlap with a time and a frequency of allocation of DL resources 514.

IBFD is in contrast to sub-band frequency division duplex (FDD), where uplink and downlink resources may overlap in time using different frequencies, as shown in the third example 520. In the third example 520, the UL resources 522 are separated from the DL resources 524 by a guard band 526. The guard band may be frequency resources, or a gap in frequency resources, provided between the UL resources 522 and the DL resources 524. Separating the UL frequency resources and the DL frequency resources with a guard band may help to reduce self-interference. UL resources and a DL resources that are immediately adjacent to each other correspond to a guard band width of 0. As an output signal, e.g., from a UE transmitter, may extend outside the UL resources, the guard band may reduce interference experienced by the UE. Sub-band FDD may also be referred to as "flexible duplex."

In some wireless communication systems, there are multiplexing rules for overlapping UCI transmissions. The multiplexing rules may be applicable to cases where a UE has resources for PUCCH transmissions or for PUCCH and PUSCH transmissions that overlap in time. For example, if there are two overlapping UCI transmissions, one for SR and another one for HARQ-ACK information, the multiplexing rule may indicate for the UE to multiplex both UCIs to the UCI resource that carries HARQ-ACK information if the UE is provided with a simultaneous HARQ-ACK channel state information (simultaneousHARQ-ACK-CSI). In another example, if a single PUCCH resource from the HARQ-ACK (and/or the SR resource) and two PUCCH resources with CSI reports are present, the rule may indicate for the UE to multiplex the HARQ-ACK information (and/or the SR) in the resource for the PUCCH transmission with the CSI report having the higher priority. The UE may refrain from transmitting the PUCCH with the CSI report having the lower priority.

For full-duplex operations, for example, the UL beam associated with the multiplexed UCI resource may be unpaired with the DL beam. For example, a base station may schedule a UE for half-duplex transmission or reception with a half-duplex beam and may also schedule the UE for transmission/reception with a full-duplex beam. The resources may overlap in time, but the half-duplex beam may be unpaired for overlapping, full-duplex transmission and reception with the full-duplex beam. The beams may be unpaired due to e.g., the inability to cancel or sufficiently mitigate the associated self-interference between concurrent transmission and reception on the two beams. The half-duplex beam may be selected based on a first metric for half-duplex communication (e.g., a reference signal received power (RSRP)), and the full-duplex beam may be selected based on a second metric for full-duplex communication (e.g., a signal to interference and noise ratio (SINR)). Thus, the second metric may consider self-interference that is not considered in the first metric. For example, a half-duplex mode beam may be based on the best RSRP beam (e.g. beam 1) among a set of candidate beams. In contrast, the full-duplex mode beam pair may be based on a best SINR beam pair that has the highest signal strength and for which the transmission (Tx) beam creates a small self-interference to its paired reception (Rx) beam (e.g. a beam pair including downlink beam 3 and uplink beam 5). If the first transmission is scheduled for half-duplex downlink beam 1 at time that overlaps the second transmission that is scheduled for the UL beam 5 from the full-duplex beam pair, beam 5 may create self-interference to the downlink reception on beam 1. Thus, beam 5 may be considered incompatible with beam 1 for full-duplex communication that includes transmission and reception that overlaps in time. Aspects described herein relate to methods for handling the incompatible uplink and downlink beams for UCI resource(s).

Figure 6:
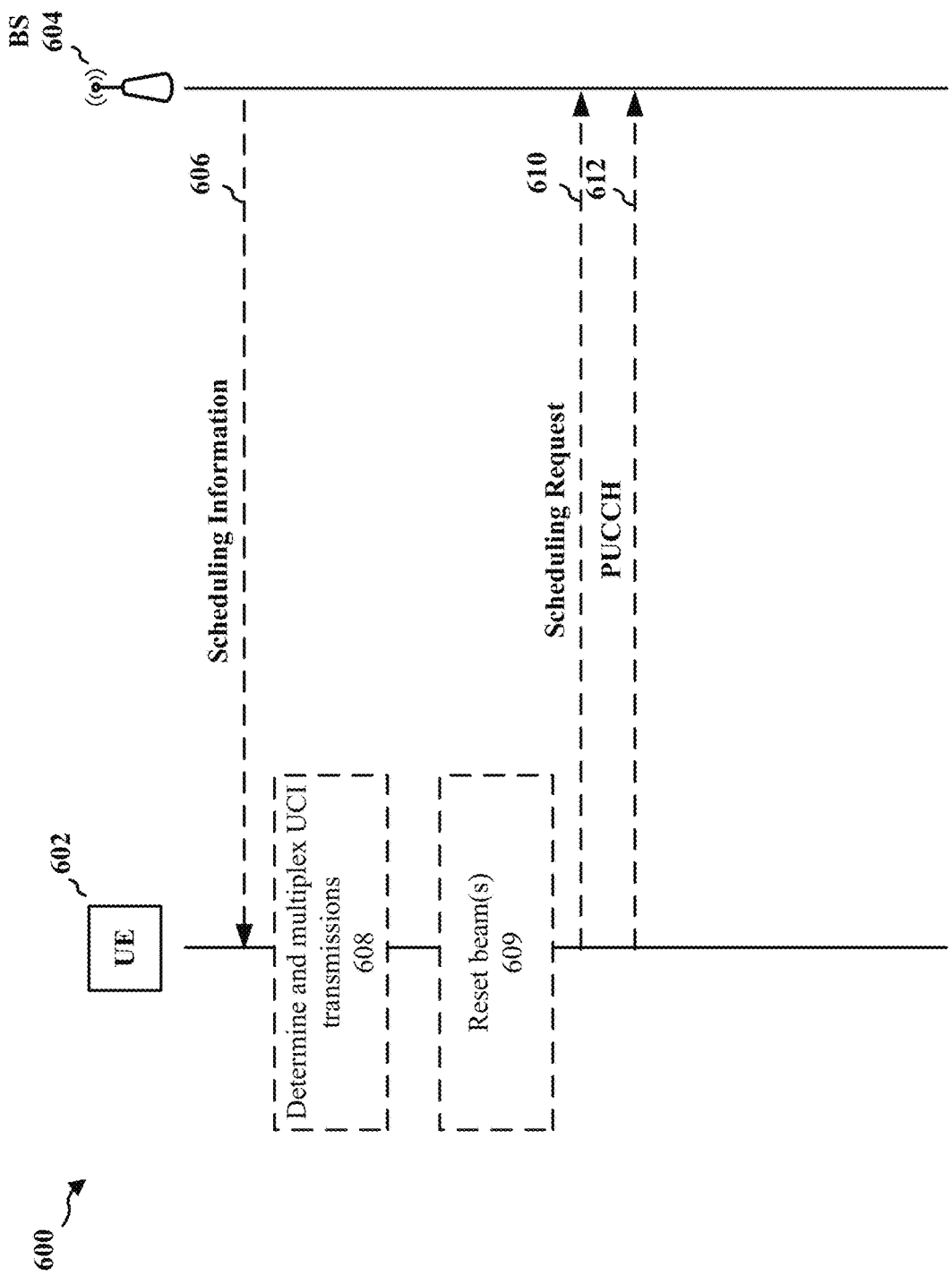
FIG. 6 illustrates example communications between a UE and a base station.

FIG. 6 illustrates example communication 600 between a UE 602 and a base station 604. As illustrated in FIG. 6, the UE 602 may multiplex, based on one or more multiplexing rules, two pending UCI transmissions after determining UCI transmissions at 608. The two pending UCI transmissions may be for FD or HD. In some aspects, there may be one pending UCI transmission for SR 610 on FD resource and another pending UCI transmission for ACK/NACK (PUCCH 612) on HD resource. In some aspects, the UE may select the resource for multiplexing multiple UCI based on a duplex mode (e.g., HD or FD) of the individual UCI. In one example, the UE 602 may multiplex (e.g., based on the one or more multiplexing rules) both UCIs to the FD UCI resource regardless of the content carried in the FD UCI. In some aspects, the multiplexing rule may lead the UE to multiplex multiple UCI in a UCI resource based on a duplex mode and content of the individual UCI. In some aspects, the UE 602 may multiplex both UCIs to the FD UCI resource based on the content carried in the FD UCI.

In some aspects, the UE may reset the DL/UL beam at 609. For example, in some aspects, if the multiplexed UCI resource is an FD resource but is associated with a different DL beam than the scheduled DL beam (e.g., a bi-directional beam pair indicated in TCI state of a PUCCH resource configuration, such as one indicated in scheduling information 606 previously transmitted from the base station 604 to the UE 602), the UE 602 may (e.g., based on the one or more multiplexing rules) reset current scheduled DL beam for reception of the scheduled DL transmission based on the TCI state's DL beam. Similarly, the base station may adjust a DL beam used to transmit a DL transmission based on the UE's multiplexed UCI in an FD resource associated with the different DL beam.

In some aspects, if the multiplexed UCI resource is an FD resource without an explicit DL beam indication that may be associated with a different DL beam than the scheduled DL beam, the UE 602 may retrieve DL beam information in a beam failure detection (BFD) or radio link management (RLM) reference signal configuration (RS) for the FD communication mode. The BFD/RLM RS may include paired DL beam in channel measurement resource (CMR) RS with an UL beam in self-interference measurement resource (IMR) RS which is the same as the multiplexed UCI resource UL beam. The UE 602 may (e.g., based on the one or more multiplexing rules) reset the DL beam used to receive the scheduled DL transmission based on the retrieved information. Similarly, the base station may adjust a DL beam used to transmit a DL transmission based on the UE's multiplexed UCI in an FD resource associated with the different DL beam.

In some aspects, the UE 602 may find one or more candidate DL beams based on a self-interference measurement (SIM) report or beam management (BM) measurement report. One of the one or more candidate DL beams may be paired with the multiplexed UCI resource UL beam. The UE 602 may (e.g., based on the one or more multiplexing rules) reset the DL beam used to receive the scheduled DL transmission based on the latest measurements and the candidate DL beams. Similarly, the base station may adjust a DL beam used to transmit a DL transmission based on the UE's multiplexed UCI in an FD resource associated with the different DL beam based on the latest measurement report.

In some aspects, if there are overlapping RACH occasions with DL SSBs in FD mode, the UE 602 may use the SSB beam to find the paired DL SSB beam with a RACH occasion UL beam which is the same as the multiplexed UCI resource beam. The UE 602 may (e.g., based on the one or more multiplexing rules) reset the DL beam based on the SSB beam. In some aspects, if the multiplexed UCI resource is not an FD resource, the UE 602 may cancel reception of the DL transmission. Similarly, the base station may cancel the DL transmission based on the UE's multiplexed UCI in an FD resource associated with the different DL beam.

In some aspects, if the multiplexed UCI resource is an FD resource associated with a different DL beam than the scheduled DL beam (e.g., a scheduled beam based on the scheduling information, the UE may change or reset the uplink beam for transmitting the multiplexed UCI. In some aspects, the UE 602 may find the paired UL beam info in a bi-directional TCI state of the downlink control information (DCI) that schedules the DL transmission (e.g., DCI in scheduling information 606), The UE 602 may (e.g., based on the one or more multiplexing rules) reset UL beam for the multiplexed UCI resource based on the information to pair with the scheduled DL beam. Similarly, the base station may change the UL beam that the base station uses to receive the multiplexed UCI.

In some aspects, if the multiplexed UCI resource is an FD resource associated with a different UL beam that is not paired with the scheduled DL beam, the UE 602 may find the new UL beam information in the BFD/RLM RS configuration (such as paired UL beam in interference measurement resource (IMR) RS configuration with the CMR RS configuration which is the same as the scheduled DL beam). The UE 602 may (e.g., based on the one or more multiplexing rules) reset (e.g., change) UL beam that the UE uses to transmit the multiplexed UCI resource based on the information to pair with the scheduled DL beam. Similarly, the base station may change the UL beam that the base station uses to receive the multiplexed UCI.

In some aspects, if the multiplexed UCI resource is an FD resource associated with a different UL beam that is not paired with the scheduled DL beam, the UE 602 may find one of the one or more candidate UL beams paired with one candidate UL beam which is the same as the scheduled DL beam based on a SIM/BM report. The UE 602 may (e.g., based on the one or more multiplexing rules) reset (e.g., change) the UL beam that the UE uses to transmit the multiplexed UCI resource based on the information to pair with the scheduled DL beam. Similarly, the base station may change the UL beam that the base station uses to receive the multiplexed UCI.

In some aspects, if the multiplexed UCI resource is an FD resource associated with a different UL beam that is not paired with the scheduled DL beam and if there are overlapping RACH occasions with DL SSBs in FD mode, the UE 602 may find the RACH preamble beam that is paired with a SSB beam which is the same as the scheduled DL beam. The UE 602 may (e.g., based on the one or more multiplexing rules) reset the UL beam that the UE uses to transmit the multiplexed UCI based on the RACH beam to pair with the scheduled DL beam. Similarly, the base station may change the UL beam that the base station uses to receive the multiplexed UCI.

In some aspects, if the multiplexed UCI resource is not an FD resource, the UE 602 may (e.g., based on the one or more multiplexing rules) cancel the UCI transmission or reception. Similarly, the base station may skip reception of the UCI.

Figure 7:
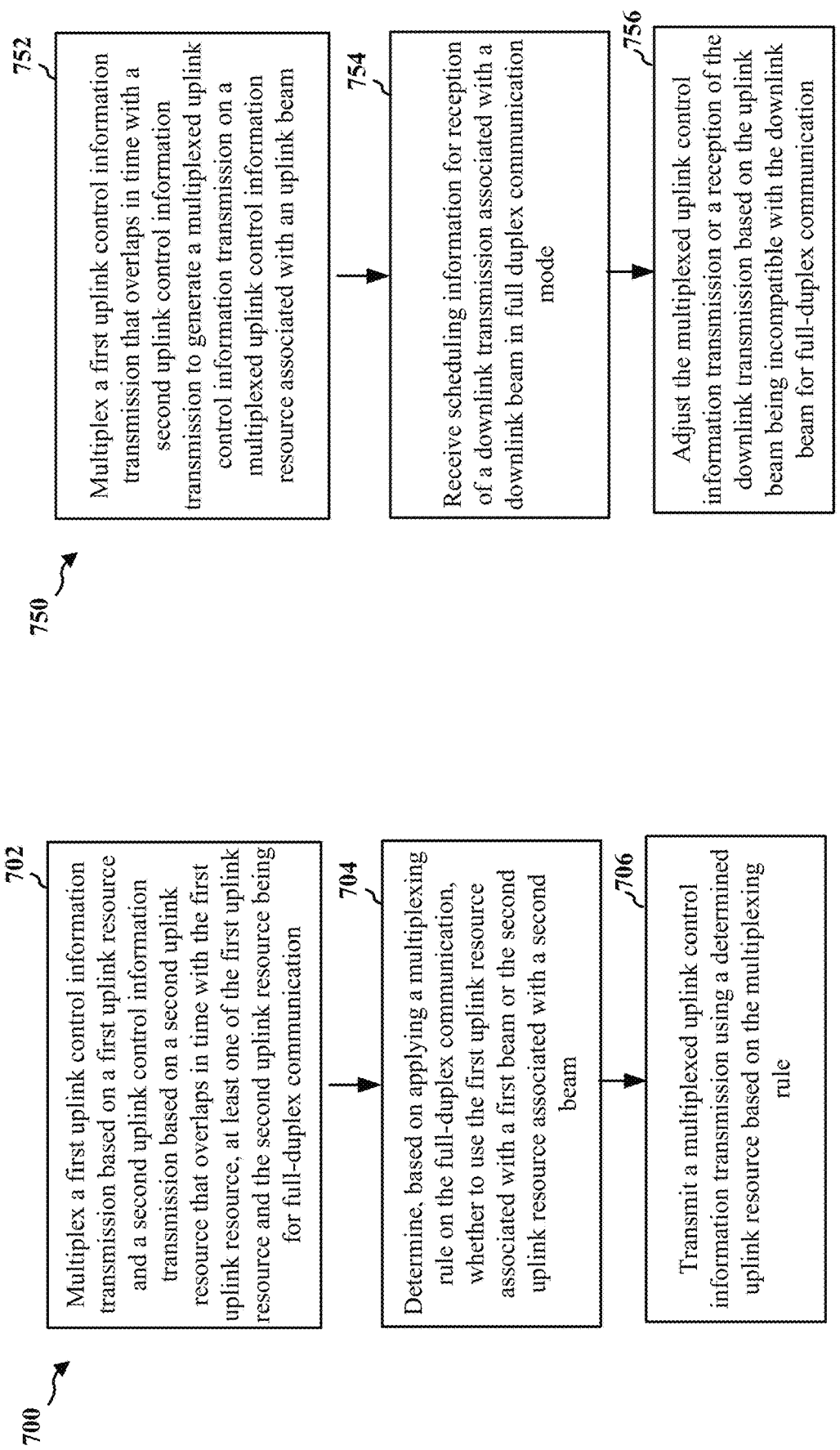
FIGS. 7A and 7B are a flowchart of a method of wireless communication.

FIG. 7A is a flowchart 700 of a method of wireless communication. The method may be performed by a UE (e.g., the UE 104, the UE 404a/b/c, the UE 406a/b/c, the UE 602; the apparatus 902). The method may enable the UE to multiplex UCI including UCI associated with FD resources and HD resources.

At 702, the UE multiplex a first uplink control information transmission based on a first uplink resource and a second uplink control information transmission based on a second uplink resource that overlaps in time with the first uplink resource, at least one of the first uplink resource and the second uplink resource being for full-duplex communication. FIG. 6 illustrates an example of a UE 602 multiplexing UCI transmissions, one for SR and one for HARQ ACK/NACK. For example, 702 may be performed by multiplex component 942 in FIG. 9.

At 704, the UE determines, based on applying a multiplexing rule on the full-duplex communication, whether to use the first uplink resource associated with a first beam or the second uplink resource associated with a second beam. For example, the UE 602 in FIG. 6 may determine to use full-duplex UCI resources to carry information for the full-duplex communication and the half-duplex communication. 704 may be performed by determining component 944 in FIG. 9. In some aspects, the UE determines the uplink resource for the full-duplex communication independent of content of the uplink control information transmission for the half-duplex communication and the uplink control information transmission for the full-duplex communication. In some aspects, if the first uplink resource and the second uplink resource are both for the full-duplex communication, the UE determines whether to use the first beam or the second beam based on content (e.g., SR, HARQ, or the like) for the first uplink control information transmission and the second uplink control information transmission.

At 706, the UE transmits a multiplexed uplink control information transmission using a determined uplink resource based on the multiplexing rule. As an example, if the first uplink resource is for half-duplex communication and the second uplink resource is for the full-duplex communication, the UE may transmit the multiplexed uplink control information transmission using the second beam associated with the second uplink resource. As another example, if the second uplink resource is for half-duplex communication and the first uplink resource is for the full-duplex communication, the UE may transmit the multiplexed uplink control information transmission using the first beam associated with the first uplink resource. 706 may be performed by UCI transmission component 946 in FIG. 9. In one example, the full-duplex communication may be for an SR and the half-duplex communication may be for a HARQ ACK/NACK as illustrated in FIG. 6.

FIG. 7B is a flowchart 750 of a method of wireless communication. The method may be performed by a UE (e.g., the UE 104, the UE 404a/b/c, the UE 406a/b/c, the UE 602; the apparatus 902). The method may enable the UE to multiplex UCI including one or more UCI associated with FD resources.

Figure 9:
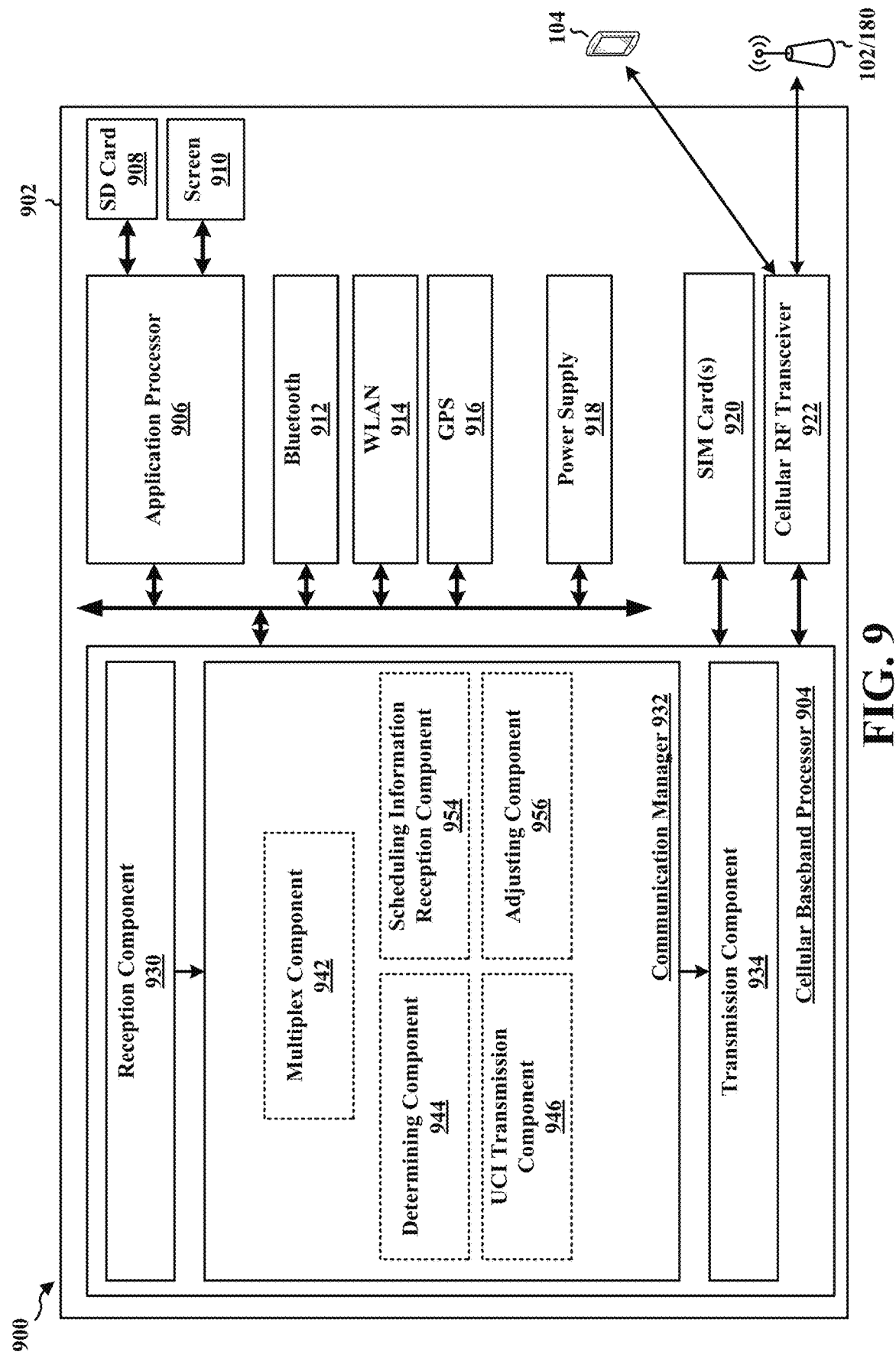
FIG. 9 is a diagram illustrating an example of a hardware implementation for an example apparatus.

At 752, the UE multiplexes a first uplink control information transmission that overlaps in time with a second uplink control information transmission to generate a multiplexed uplink control information transmission on a multiplexed uplink control information resource associated with an uplink beam. 752 may be performed by multiplex component 942 in FIG. 9. For example, similar to the UE 602 in FIG. 6, the multiplexed UCI resource may be an FD resource associated with a different DL beam than the scheduled DL beam. In some aspects, the multiplexed UCI resource is an FD resource associated with a different UL beam that is not paired with the scheduled DL beam.

At 754, the UE receives scheduling information for reception of a downlink transmission associated with a downlink beam in full-duplex communication mode. 754 may be performed by scheduling information reception component 954 in FIG. 9. For example, the scheduling information may schedule the downlink beam. In some aspects, the scheduled downlink beam may be adjusted at 756 due to being unpaired with the uplink beam.

At 756, the UE adjusts the multiplexed uplink control information transmission or a reception of the downlink transmission based on the uplink beam being unpaired with the downlink beam for full-duplex communication. For example, the first beam may be selected based on a first metric (e.g., RSRP) for the half-duplex mode and the second beam may be selected based on a second metric (e.g., SINR or SIM) for a full-duplex mode wherein the second beam is selected to be paired with a third beam for the full-duplex mode. The second metric may include a self-interference metric that is not comprised in the first metric. The second beam may be incompatible with the first beam based on self-interference between overlapping full-duplex communication on the first beam and the second beam as a pair for the full-duplex mode. For example, an uplink transmission on the first or second beam may cause a threshold level of self-interference to downlink reception on the other beam in a full-duplex mode. In some aspects, 756 may be performed by adjusting component 956 in FIG. 9. Similar to the UE 602 in FIG. 6, in some aspects, the adjusting may include transmitting the multiplexed uplink control information transmission using a paired uplink beam paired with the downlink beam from the scheduling information of the downlink transmission from a TCI state of the scheduling information for the downlink transmission. In some aspects, the adjusting may include receiving the downlink transmission using a downlink beam paired with the uplink beam of the multiplexed control information uplink resource from a TCI state from the multiplexed control information uplink resource configuration for the uplink control information transmission. In some aspects, the adjusting may include receiving the downlink transmission using a paired downlink beam instead of the downlink beam from the scheduling information of the downlink transmission based on a reference signal configuration for beam failure detection or radio link management for a full-duplex communication mode that indicates a beam pairing between the uplink beam. The uplink beam may be the same as the uplink beam of the multiplexed control information uplink resource and the paired downlink beam. In some aspects, the adjusting may include transmitting the multiplexed uplink control information transmission using a paired uplink beam instead of the uplink beam of the multiplexed control information uplink resource based on a reference signal configuration for beam failure detection or radio link management for a full-duplex communication mode that indicates a beam pairing between the paired uplink beam and the downlink beam from the scheduling information of the downlink transmission. In some aspects, the adjusting may include receiving the downlink transmission using a paired downlink beam instead of the downlink beam from the scheduling information of the downlink transmission paired with the uplink beam based on a SIM or a BM measurement associated with the uplink beam. In such aspects, the uplink beam may be the same as the uplink beam of the multiplexed control information uplink resource. Similarly, in some aspects, the adjusting may include transmitting the multiplexed uplink control information transmission using a paired uplink beam instead of the uplink beam of the multiplexed control information uplink resource paired with the downlink beam based on a SIM or BM measurement associated with the downlink beam from the scheduling information of the downlink transmission. In some aspects, the adjusting may include receiving the downlink transmission using a paired downlink beam instead of the downlink beam from the scheduling information of the downlink transmission based on a downlink SSB that overlaps with a RACH occasion in full-duplex mode. The RACH occasion beam may correspond to the uplink beam for transmitting the multiplexed uplink control information transmission. In some aspects, the adjusting may include transmitting the multiplexed uplink control information transmission using a paired uplink beam instead of the uplink beam of the multiplexed control information uplink resource based on a downlink SSB that overlaps with RACH occasions in full-duplex mode. The SSB beam may be associated with the downlink beam from the scheduling information of the downlink transmission. In some aspects, the adjusting may include dropping reception of the downlink transmission based on the multiplexed uplink resource being a half-duplex resource. In some aspects, the adjusting may include dropping transmission of the multiplexed uplink control information transmission based on the multiplexed uplink resource being a half-duplex resource.

Figure 8:
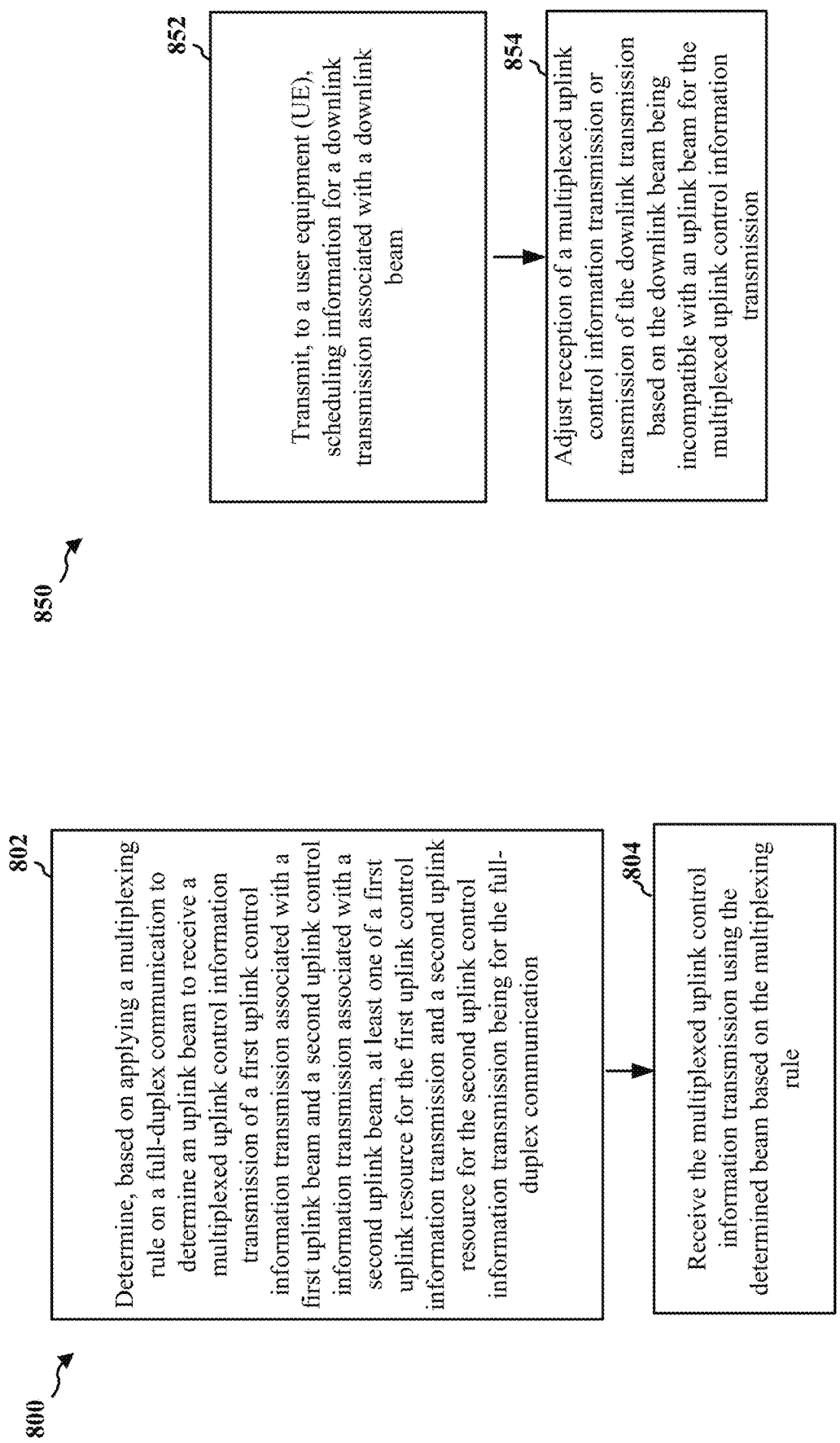
FIGS. 8A and 8B are a flowchart of a method of wireless communication.

FIG. 8A is a flowchart 800 of a method of wireless communication. The method may be performed by a base station (e.g., the base station 102/180, the base station 402*a/b/c*, the base station 604; the apparatus 1002. The method may enable the base station to improve communication with a UE that multiplexes UCI including UCI associated with FD resources and HD resources.

At 802, the base station determines, based on applying a multiplexing rule on a full-duplex communication to determine an uplink beam to receive a multiplexed uplink control information transmission of a first uplink control information transmission associated with a first uplink beam and a second uplink control information transmission associated with a second uplink beam, at least one of a first uplink resource for the first uplink control information transmission and a second uplink resource for the second uplink control information transmission being for the full-duplex communication. For example, 802 may be performed by determining component 1042 in FIG. 10.

At 804, the base station receives the multiplexed uplink control information transmission using the determined beam based on the multiplexing rule. For example, the base station 604 in FIG. 6 may receive UCI transmissions for the full-duplex communication and the half-duplex communication via full-duplex UCI resources to carry information. 804 may be performed by UCI reception component 1044 in FIG. 10. For example, if the first uplink resource is for half-duplex communication and the second uplink resource is for the full-duplex communication, the base station receives the multiplexed uplink control information transmission using the second beam associated with the second uplink resource. Similarly, if the second uplink resource is for half-duplex communication and the first uplink resource is for the full-duplex communication, the base station receives the multiplexed uplink control information transmission using the first beam associated with the first uplink resource.

FIG. 8B is a flowchart 850 of a method of wireless communication. The method may be performed by a base station (e.g., the base station 102/180, the base station 402*a/b/c*, the base station 604; the apparatus 1002. The method may enable the base station to improve communication with a UE that multiplexes UCI including one or more UCI associated with FD resources.

At 852, the base station transmits, to a UE, scheduling information for a downlink transmission associated with a downlink beam. For example, 852 may be performed by scheduling information transmitting component 1052 in FIG. 10. In some aspects, the scheduling information may be the scheduling information in FIG. 6.

At 854, the base station adjusts reception of a multiplexed uplink control information transmission or transmission of the downlink transmission based on the downlink beam being unpaired with an uplink beam associated with a multiplexed uplink resource for the multiplexed uplink control information transmission. For example, the first beam may be selected based on a first metric (e.g., RSRP) for the half-duplex mode and the second beam may be selected based on a second metric (e.g., SINR or SIM) for a full-duplex mode wherein the second beam is selected to be paired with a third beam for the full-duplex mode. The second metric may include a self-interference metric that is not comprised in the first metric. The second beam may be incompatible with the first beam based on self-interference between overlapping full-duplex communication on the first beam and the second beam as a pair for the full-duplex mode. For example, an uplink transmission on the first or second beam may cause a threshold level of self-interference to downlink reception on the other beam in a full-duplex mode. In some aspects, 854 may be performed by adjusting component 1054 in FIG. 10. In some aspects, the multiplexed uplink resource is a full-duplex resource that is associated with a different downlink beam than the downlink beam scheduled for the downlink transmission. In some aspects, the adjusting includes receiving the multiplexed uplink control information transmission using a paired uplink beam paired with the downlink beam from the scheduling information of the downlink transmission from a TCI state of the scheduling information for the downlink transmission. In some aspects, the adjusting includes receiving the downlink transmission using a downlink beam paired with the uplink beam of the multiplexed control information uplink resource from a TCI state from the multiplexed control information uplink resource configuration for the uplink control information transmission. In some aspects, the adjusting includes receiving the downlink transmission using a paired downlink beam instead of the downlink beam from the scheduling information of the downlink transmission based on a reference signal configuration for beam failure detection or radio link management for a full-duplex communication mode that indicates a beam pairing between the uplink beam wherein the uplink beam is the same as the uplink beam of the multiplexed control information uplink resource and the paired downlink beam. In some aspects, the adjusting includes receiving the multiplexed uplink control information transmission using a paired uplink beam instead of the uplink beam of the multiplexed control information uplink resource based on a reference signal configuration for beam failure detection or radio link management for a full-duplex communication mode that indicates a beam pairing between the paired uplink beam and the downlink beam from the scheduling information of the downlink transmission. In some aspects, the adjusting includes receiving the downlink transmission using a paired downlink beam instead of the downlink beam from the scheduling information of the downlink transmission paired with the uplink beam based on a SIM or a BM measurement associated with the uplink beam wherein the uplink beam is the same as the uplink beam of the multiplexed control information uplink resource. In some aspects, the adjusting includes receiving the multiplexed uplink control information transmission using a paired uplink beam instead of the uplink beam of the multiplexed control information uplink resource paired with the downlink beam based on a SIM or a BM measurement associated with the downlink beam from the scheduling information of the downlink transmission. In some aspects, the adjusting includes receiving the downlink transmission using a paired downlink beam instead of the downlink beam from the scheduling information of the downlink transmission based on a downlink SSB that overlaps with a RACH occasion in full-duplex mode, wherein a RACH occasion beam corresponds to the uplink beam for transmitting the multiplexed uplink control information transmission. In some aspects, the adjusting includes adjusting the reception of the multiplexed uplink control information transmission using a paired uplink beam instead of the uplink beam of the multiplexed control information uplink resource based on a downlink SSB that overlaps with RACH occasions in full-duplex mode wherein the SSB beam is associated with the downlink beam from the scheduling information of the downlink transmission.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 may include a multiplex component 942 that is configured to multiplex a first uplink control information transmission based on a first uplink resource and a second uplink control information transmission based on a second uplink resource that overlaps in time with the first uplink resource, at least one of the first uplink resource and the second uplink resource being for full-duplex communication or multiplex a first uplink control information transmission that overlaps in time with a second uplink control information transmission to generate a multiplexed uplink control information transmission on a multiplexed uplink control information resource associated with an uplink beam, e.g., as described in connection with 702 in FIG. 7A and 752 in FIG. 7B. The communication manager may further include a determining component 944 configured to determine, based on applying a multiplexing rule on the full-duplex communication, whether to use the first uplink resource associated with a first beam or the second uplink resource associated with a second beam, e.g., as described in connection with 704 in FIG. 7A. The communication manager may further include a UCI transmission component 946 configured to transmit a multiplexed uplink control information transmission using a determined uplink resource based on the multiplexing rule, e.g., as described in connection with 706 in FIG. 7A. The communication manager may further include a UCI transmission component 946 configured to transmit a multiplexed uplink control information transmission using a determined uplink resource based on the multiplexing rule, e.g., as described in connection with 706 in FIG. 7A. The communication manager may further include a scheduling information reception component 954 configured to receive scheduling information for reception of a downlink transmission associated with a downlink beam in full-duplex communication mode, e.g., as described in connection with 754 in FIG. 7A. The communication manager may further include an adjusting component 956 configured to adjust the multiplexed uplink control information transmission or a reception of the downlink transmission based on the uplink beam being unpaired with the downlink beam for full-duplex communication, e.g., as described in connection with 756 in FIG. 7B.

The apparatus may include additional components that perform each of the blocks of the algorithm in the aforementioned flowcharts of FIGS. 7A and 7B. As such, each block in the aforementioned flowcharts of FIGS. 7A and 7B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, may include means for multiplexing a first uplink control information transmission based on a first uplink resource and a second uplink control information transmission based on a second uplink resource that overlaps in time with the first uplink resource, at least one of the first uplink resource and the second uplink resource being for full-duplex communication. The cellular baseband processor 904 may further include means for determining, based on applying a multiplexing rule on the full-duplex communication, whether to use the first uplink resource associated with a first beam or the second uplink resource associated with a second beam. The cellular baseband processor 904 may further include means for transmitting a multiplexed uplink control information transmission using a determined uplink resource based on the multiplexing rule. The cellular baseband processor 904 may further include means for multiplexing a first uplink control information transmission that overlaps in time with a second uplink control information transmission to generate a multiplexed uplink control information transmission on a multiplexed uplink control information resource associated with an uplink beam. The cellular baseband processor 904 may further include means for receiving scheduling information for reception of a downlink transmission associated with a downlink beam in full-duplex communication mode. The cellular baseband processor 904 may further include means for adjusting the multiplexed uplink control information transmission or a reception of the downlink transmission based on the uplink beam being unpaired with the downlink beam for full-duplex communication.

The aforementioned means may be one or more of the aforementioned components of the apparatus 902 configured to perform the functions recited by the aforementioned means. As described supra, the apparatus 902 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 10:
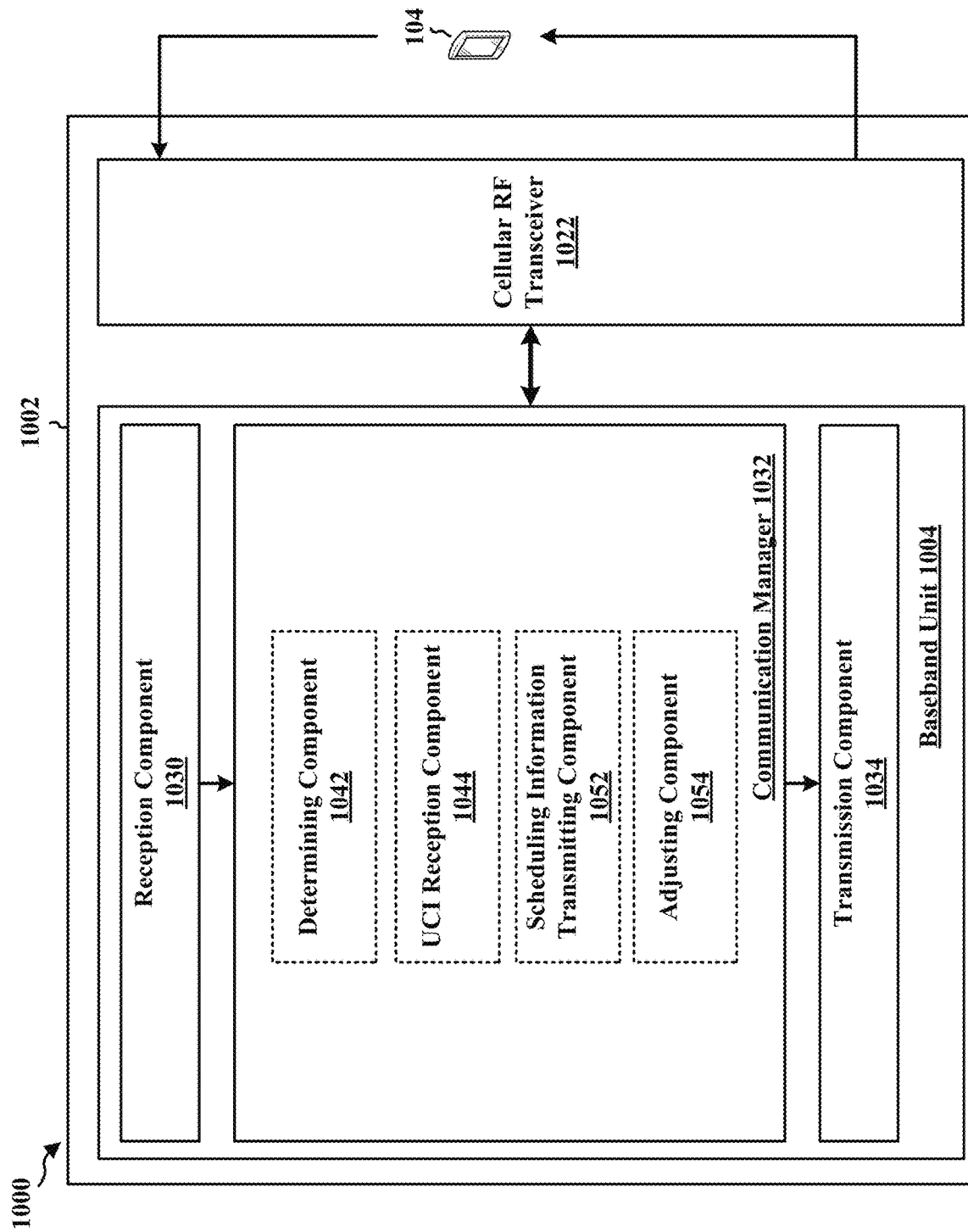
FIG. 10 is a diagram illustrating an example of a hardware implementation for an example apparatus.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 may include a determining component 1042 that determines, based on applying a multiplexing rule on a full-duplex communication to determine an uplink beam to receive a multiplexed uplink control information transmission of a first uplink control information transmission associated with a first uplink beam and a second uplink control information transmission associated with a second uplink beam, at least one of a first uplink resource for the first uplink control information transmission and a second uplink resource for the second uplink control information transmission being for the full-duplex communication, e.g., as described in connection with 802 in FIG. 8A. The communication manager 1032 may further include a UCI reception component 1044 that receives the multiplexed uplink control information transmission using the determined beam based on the multiplexing rule, e.g., as described in connection with 804 in FIG. 8A. The communication manager 1032 may further include a scheduling information transmitting component 1052 that transmits, to a UE, scheduling information for a downlink transmission associated with a downlink beam, e.g., as described in connection with 852 in FIG. 8B. The communication manager 1032 may further include an adjusting component 1054 that adjusts reception of a multiplexed uplink control information transmission or transmission of the downlink transmission based on the downlink beam being unpaired with an uplink beam associated with a multiplexed uplink resource for the multiplexed uplink control information transmission, e.g., as described in connection with 854 in FIG. 8B.

The apparatus may include additional components that perform each of the blocks of the algorithm in the aforementioned flowcharts of FIGS. 8A and 8B. As such, each block in the aforementioned flowcharts of FIG. 8A and 8B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, may include means for determining, based on applying a multiplexing rule on a full-duplex communication to determine an uplink beam to receive a multiplexed uplink control information transmission of a first uplink control information transmission associated with a first uplink beam and a second uplink control information transmission associated with a second uplink beam, at least one of a first uplink resource for the first uplink control information transmission and a second uplink resource for the second uplink control information transmission being for the full-duplex communication. The baseband unit 1004 may further include means for receiving the multiplexed uplink control information transmission using the determined beam based on the multiplexing rule. The baseband unit 1004 may further include means for transmitting, to a UE, scheduling information for a downlink transmission associated with a downlink beam. The baseband unit 1004 may further include means for adjusting reception of a multiplexed uplink control information transmission or transmission of the downlink transmission based on the downlink beam being unpaired with an uplink beam associated with a multiplexed uplink resource for the multiplexed uplink control information transmission. The aforementioned means may be one or more of the aforementioned components of the apparatus 1002 configured to perform the functions recited by the aforementioned means. As described supra, the apparatus 1002 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: multiplexing a first uplink control information transmission based on a first uplink resource and a second uplink control information transmission based on a second uplink resource that overlaps in time with the first uplink resource, at least one of the first uplink resource and the second uplink resource being for full-duplex communication;

determining, based on applying a multiplexing rule on the full-duplex communication, whether to use the first uplink resource associated with a first beam or the second uplink resource associated with a second beam; and transmitting a multiplexed uplink control information transmission using a determined uplink resource based on the multiplexing rule.

Aspect 2 is the method of aspect 1, wherein: if the first uplink resource is for half-duplex communication and the second uplink resource is for the full-duplex communication, the UE transmits the multiplexed uplink control information transmission using the second beam associated with the second uplink resource; and if the second uplink resource is for half-duplex communication and the first uplink resource is for the full-duplex communication, the UE transmits the multiplexed uplink control information transmission using the first beam associated with the first uplink resource.

Aspect 3 is the method of aspect 2, wherein the UE determines the uplink resource for the full-duplex communication independent of content of the uplink control information transmission for the half-duplex communication and the uplink control information transmission for the full-duplex communication.

Aspect 4 is the method of any of aspects 1 to 3, wherein if the first uplink resource and the second uplink resource are both for the full-duplex communication, the UE determines whether to use the first beam or the second beam based on content for the first uplink control information transmission and the second uplink control information transmission.

Aspect 5 is a method of wireless communication at a UE, comprising: multiplexing a first uplink control information transmission that overlaps in time with a second uplink control information transmission to generate a multiplexed uplink control information transmission on a multiplexed uplink control information resource associated with an uplink beam; receiving scheduling information for reception of a downlink transmission associated with a downlink beam in full-duplex communication mode; and adjusting the multiplexed uplink control information transmission or a reception of the downlink transmission based on the uplink beam being unpaired with the downlink beam for full-duplex communication.

Aspect 6 is the method of aspect 5, wherein the multiplexed uplink resource is a full-duplex resource that is associated with a different downlink beam than the downlink beam scheduled for the downlink transmission, and adjusting the multiplexed uplink control information transmission or the reception of the downlink transmission includes: transmitting the multiplexed uplink control information transmission using a paired uplink beam paired with the downlink beam from the scheduling information of the downlink transmission from a TCI state of the scheduling information for the downlink transmission.

Aspect 7 is the method of any of aspects 5 to 6, wherein the multiplexed uplink resource is a full-duplex resource that is associated with a different downlink beam than the downlink beam scheduled for the downlink transmission, and adjusting the multiplexed uplink control information transmission or the reception of the downlink transmission includes: receiving the downlink transmission using a downlink beam paired with the uplink beam of the multiplexed control information uplink resource from a TCI state from the multiplexed control information uplink resource configuration for the uplink control information transmission.

Aspect 8 is the method of any of aspects 5 to 7, wherein the multiplexed uplink resource is a full-duplex resource that is associated with a different downlink beam than the downlink beam scheduled for the downlink transmission, and adjusting the multiplexed uplink control information transmission or the reception of the downlink transmission includes: receiving the downlink transmission using a paired downlink beam instead of the downlink beam from the scheduling information of the downlink transmission based on a reference signal configuration for beam failure detection or radio link management for a full-duplex communication mode that indicates a beam pairing between the uplink beam wherein the uplink beam is the same as the uplink beam of the multiplexed control information uplink resource and the paired downlink beam.

Aspect 9 is the method of any of aspects 5 to 8, wherein the multiplexed uplink resource is a full-duplex resource that is associated with a different downlink beam than the downlink beam scheduled for the downlink transmission, and adjusting the multiplexed uplink control information transmission or the reception of the downlink transmission includes: transmitting the multiplexed uplink control information transmission using a paired uplink beam instead of the uplink beam of the multiplexed control information uplink resource based on a reference signal configuration for beam failure detection or radio link management for a full-duplex communication mode that indicates a beam pairing between the paired uplink beam and the downlink beam from the scheduling information of the downlink transmission.

Aspect 10 is the method of any of aspects 5 to 9, wherein the multiplexed uplink resource is a full-duplex resource that is associated with a different downlink beam than the downlink beam scheduled for the downlink transmission, and adjusting the multiplexed uplink control information transmission or the reception of the downlink transmission includes: receiving the downlink transmission using a paired downlink beam instead of the downlink beam from the scheduling information of the downlink transmission paired with the uplink beam based on a SIM or a BM measurement associated with the uplink beam wherein the uplink beam is the same as the uplink beam of the multiplexed control information uplink resource.

Aspect 11 is the method of any of aspects 5 to 10, wherein the multiplexed uplink resource is a full-duplex resource that is associated with a different downlink beam than the downlink beam scheduled for the downlink transmission, and adjusting the multiplexed uplink control information transmission or the reception of the downlink transmission includes: transmitting the multiplexed uplink control information transmission using a paired uplink beam instead of the uplink beam of the multiplexed control information uplink resource paired with the downlink beam based on a SIM or a BM measurement associated with the downlink beam from the scheduling information of the downlink transmission.

Aspect 12 is the method of any of aspects 5 to 11, wherein the multiplexed uplink resource is a full-duplex resource that is associated with a different downlink beam than the downlink beam scheduled for the downlink transmission, and adjusting the multiplexed uplink control information transmission or the reception of the downlink transmission includes: receiving the downlink transmission using a paired downlink beam instead of the downlink beam from the scheduling information of the downlink transmission based on a downlink SSB that overlaps with a RACH occasion in full-duplex mode, wherein a RACH occasion beam corresponds to the uplink beam for transmitting the multiplexed uplink control information transmission.

Aspect 13 is the method of any of aspects 5 to 12, wherein the multiplexed uplink resource is a full-duplex resource that is associated with a different downlink beam than the downlink beam scheduled for the downlink transmission, and adjusting the multiplexed uplink control information transmission or the reception of the downlink transmission includes: transmitting the multiplexed uplink control information transmission using a paired uplink beam instead of the uplink beam of the multiplexed control information uplink resource based on a downlink SSB that overlaps with RACH occasions in full-duplex mode wherein the SSB beam is associated with the downlink beam from the scheduling information of the downlink transmission.

Aspect 14 is the method of any of aspects 5 to 13, wherein adjusting the multiplexed uplink control information transmission or the reception of the downlink transmission includes: dropping reception of the downlink transmission based on the multiplexed uplink resource being a half-duplex resource.

Aspect 15 is the method of any of aspects 5 to 14, wherein adjusting the multiplexed uplink control information transmission or the reception of the downlink transmission includes: dropping transmission of the multiplexed uplink control information transmission based on the multiplexed uplink resource being a half-duplex resource.

Aspect 16 is a method of wireless communication at a base station, comprising: determining, based on applying a multiplexing rule on a full-duplex communication to determine an uplink beam to receive a multiplexed uplink control information transmission of a first uplink control information transmission associated with a first uplink beam and a second uplink control information transmission associated with a second uplink beam, at least one of a first uplink resource for the first uplink control information transmission and a second uplink resource for the second uplink control information transmission being for the full-duplex communication; and receiving the multiplexed uplink control information transmission using the determined beam based on the multiplexing rule.

Aspect 17 is the method of aspect 16, wherein: if the first uplink resource is for half-duplex communication and the second uplink resource is for the full-duplex communication, the base station receives the multiplexed uplink control information transmission using the second beam associated with the second uplink resource; and if the second uplink resource is for half-duplex communication and the first uplink resource is for the full-duplex communication, the base station receives the multiplexed uplink control information transmission using the first beam associated with the first uplink resource.

Aspect 18 is a method of wireless communication at a base station, comprising: transmitting, to a UE, scheduling information for a downlink transmission associated with a downlink beam; and adjusting reception of a multiplexed uplink control information transmission or transmission of the downlink transmission based on the downlink beam being unpaired with an uplink beam associated with a multiplexed uplink resource for the multiplexed uplink control information transmission.

Aspect 19 is the method of aspect 18, wherein the multiplexed uplink resource is a full-duplex resource that is associated with a different downlink beam than the downlink beam scheduled for the downlink transmission, and adjusting the reception of multiplexed uplink control information transmission or the downlink transmission includes: receiving the multiplexed uplink control information transmission using a paired uplink beam paired with the downlink beam from the scheduling information of the downlink transmission from a TCI state of the scheduling information for the downlink transmission.

Aspect 20 is the method of any of aspects 18 to 19, wherein the multiplexed uplink resource is a full-duplex resource that is associated with a different downlink beam than the downlink beam scheduled for the downlink transmission, and adjusting the reception of the multiplexed uplink control information transmission or the downlink transmission includes: receiving the downlink transmission using a downlink beam paired with the uplink beam of the multiplexed control information uplink resource from a TCI state from the multiplexed control information uplink resource configuration for the uplink control information transmission.

Aspect 21 is the method of any of aspects 18 to 20, wherein the multiplexed uplink resource is a full-duplex resource that is associated with a different downlink beam than the downlink beam scheduled for the downlink transmission, and adjusting the reception of the multiplexed uplink control information transmission or the downlink transmission includes: receiving the downlink transmission using a paired downlink beam instead of the downlink beam from the scheduling information of the downlink transmission based on a reference signal configuration for beam failure detection or radio link management for a full-duplex communication mode that indicates a beam pairing between the uplink beam wherein the uplink beam is the same as the uplink beam of the multiplexed control information uplink resource and the paired downlink beam.

Aspect 22 is the method of any of aspects 18 to 21, wherein the multiplexed uplink resource is a full-duplex resource that is associated with a different downlink beam than the downlink beam scheduled for the downlink transmission, and adjusting the reception of the multiplexed uplink control information transmission or the downlink transmission includes: receiving the multiplexed uplink control information transmission using a paired uplink beam instead of the uplink beam of the multiplexed control information uplink resource based on a reference signal configuration for beam failure detection or radio link management for a full-duplex communication mode that indicates a beam pairing between the paired uplink beam and the downlink beam from the scheduling information of the downlink transmission.

Aspect 23 is the method of any of aspects 18 to 22, wherein the multiplexed uplink resource is a full-duplex resource that is associated with a different downlink beam than the downlink beam scheduled for the downlink transmission, and adjusting the reception of the multiplexed uplink control information transmission or the downlink transmission includes: receiving the downlink transmission using a paired downlink beam instead of the downlink beam from the scheduling information of the downlink transmission paired with the uplink beam based on a SIM or a BM measurement associated with the uplink beam wherein the uplink beam is the same as the uplink beam of the multiplexed control information uplink resource.

Aspect 24 is the method of any of aspects 18 to 23, wherein the multiplexed uplink resource is a full-duplex resource that is associated with a different downlink beam than the downlink beam scheduled for the downlink transmission, and adjusting the reception of the multiplexed uplink control information transmission or the downlink transmission includes: receiving the multiplexed uplink control information transmission using a paired uplink beam instead of the uplink beam of the multiplexed control information uplink resource paired with the downlink beam based on a SIM or a BM measurement associated with the downlink beam from the scheduling information of the downlink transmission.

Aspect 25 is the method of any of aspects 18 to 24, wherein the multiplexed uplink resource is a full-duplex resource that is associated with a different downlink beam than the downlink beam scheduled for the downlink transmission, and adjusting the reception of the multiplexed uplink control information transmission or the downlink transmission includes: receiving the downlink transmission using a paired downlink beam instead of the downlink beam from the scheduling information of the downlink transmission based on a downlink SSB that overlaps with a RACH occasion in full-duplex mode, wherein a RACH occasion beam corresponds to the uplink beam for transmitting the multiplexed uplink control information transmission.

Aspect 26 is the method of any of aspects 18 to 25, wherein the multiplexed uplink resource is a full-duplex resource that is associated with a different downlink beam than the downlink beam scheduled for the downlink transmission, and adjusting the reception of the multiplexed uplink control information transmission or the downlink transmission includes: adjusting the reception of the multiplexed uplink control information transmission using a paired uplink beam instead of the uplink beam of the multiplexed control information uplink resource based on a SSB that overlaps with RACH occasions in full-duplex mode wherein the SSB beam is associated with the downlink beam from the scheduling information of the downlink transmission.

Aspect 27 is an apparatus for wireless communication including at least one processor coupled to a memory and configured to implement a method as in any of aspects 1 to 4.

Aspect 28 is an apparatus for wireless communication including at least one processor coupled to a memory and configured to implement a method as in any of aspects 5 to 15.

Aspect 29 is an apparatus for wireless communication including at least one processor coupled to a memory and configured to implement a method as in any of aspects 16 to 17.

Aspect 30 is an apparatus for wireless communication including at least one processor coupled to a memory and configured to implement a method as in any of aspects 18 to 26.

Aspect 31 is an apparatus for wireless communication including means for implementing a method as in any of aspects 1 to 4.

Aspect 32 is an apparatus for wireless communication including means for implementing a method as in any of aspects 5 to 15.

Aspect 33 is an apparatus for wireless communication including means for implementing a method as in any of aspects 16 to 17.

Aspect 34 is an apparatus for wireless communication including means for implementing a method as in any of aspects 18 to 26.

Aspect 35 is a computer-readable medium storing computer executable code, where the code when executed by a processor causes the processor to implement a method as in any of aspects 1 to 4.

Aspect 36 is a computer-readable medium storing computer executable code, where the code when executed by a processor causes the processor to implement a method as in any of aspects 5 to 15.

Aspect 37 is a computer-readable medium storing computer executable code, where the code when executed by a processor causes the processor to implement a method as in any of aspects 16 to 17.

Aspect 38 is a computer-readable medium storing computer executable code, where the code when executed by a processor causes the processor to implement a method as in any of aspects 18 to 26.

What is claimed is:

1. A method of wireless communication at a base station, comprising:
   determining, based on applying a multiplexing rule on a full-duplex communication to determine an uplink beam to receive a multiplexed uplink control information transmission of a first uplink control information transmission associated with a first uplink beam and a second uplink control information transmission associated with a second uplink beam, at least one of a first uplink control information resource for the first uplink control information transmission and a second uplink control information resource for the second uplink control information transmission being for the full-duplex communication, wherein the multiplexing rule indicates whether to use the first uplink beam associated with the first uplink control information resource or the second uplink beam associated with the second uplink control information resource based at least in part on whether the first uplink control information resource is for half-duplex communication or full-duplex communication and whether the second uplink control information resource is for half-duplex communication or full-duplex communication; and
   receiving the multiplexed uplink control information transmission using the determined uplink beam based on the multiplexing rule.

2. The method of claim 1, wherein receiving the multiplexed uplink control information transmission further comprises:
   receiving the multiplexed uplink control information transmission using the second uplink beam associated with the second uplink control information resource based on the first uplink control information resource being for half-duplex communication and the second uplink control information resource being for the full-duplex communication.

3. The method of claim 1, wherein receiving the multiplexed uplink control information transmission further comprises:
   receiving the multiplexed uplink control information transmission using the first uplink beam associated with the first uplink control information resource based on the second uplink control information resource being for a half-duplex communication and the first uplink control information resource being for the full-duplex communication.

4. An apparatus of wireless communication at a base station, comprising:
   a memory; and
   at least one processor coupled to the memory and, based at least in part on information stored in the memory, the at least one processor is configured to cause the apparatus to:
      determine, based on applying a multiplexing rule on a full-duplex communication to determine an uplink beam to receive a multiplexed uplink control information transmission of a first uplink control information transmission associated with a first uplink beam and a second uplink control information transmission associated with a second uplink beam, at least one of a first uplink control information resource for the first uplink control information transmission and a second uplink control information resource for the second uplink control information transmission being for the full-duplex communication, wherein the multiplexing rule indicates whether to use the first uplink beam associated with the first uplink control information resource or the second uplink beam associated with the second uplink control information resource based at least in part on whether the first uplink control information resource is for half-duplex communication or full-duplex communication and whether the second uplink control information resource is for half-duplex communication or full-duplex communication; and
      receive the multiplexed uplink control information transmission using the determined uplink beam based on the multiplexing rule.

5. The apparatus of claim 4, wherein to receive the multiplexed uplink control information transmission the at least one processor is further configured to cause the apparatus to:
   receive the multiplexed uplink control information transmission using the second uplink beam associated with the second uplink control information resource based on the first uplink control information resource being for half-duplex communication and the second uplink control information resource being for the full-duplex communication.

6. The apparatus of claim 4, wherein to receive the multiplexed uplink control information transmission the at least one processor is further configured to cause the apparatus to:
receive the multiplexed uplink control information transmission using the first uplink beam associated with the first uplink control information resource based on the second uplink control information resource being for half-duplex communication and the first uplink control information resource being for the full-duplex communication.

7. A non-transitory computer-readable medium storing computer executable code at a base station, the code when executed by a processor causes the processor to:
determine, based on applying a multiplexing rule on a full-duplex communication to determine an uplink beam to receive a multiplexed uplink control information transmission of a first uplink control information transmission associated with a first uplink beam and a second uplink control information transmission associated with a second uplink beam, at least one of a first uplink control information resource for the first uplink control information transmission and a second uplink control information resource for the second uplink control information transmission being for the full-duplex communication, wherein the multiplexing rule indicates whether to use the first uplink beam associated with the first uplink control information resource or the second uplink beam associated with the second uplink control information resource based at least in part on whether the first uplink control information resource is for half-duplex communication or full-duplex communication and whether the second uplink control information resource is for half-duplex communication or full-duplex communication; and
receive the multiplexed uplink control information transmission using the determined uplink beam based on the multiplexing rule.

8. The non-transitory computer-readable medium of claim 7, wherein to cause the processor to receive the multiplexed uplink control information transmission the code when executed by the processor further causes the processor to:
receive the multiplexed uplink control information transmission using the second uplink beam associated with the second uplink control information resource based on the first uplink control information resource being for half-duplex communication and the second uplink control information resource being for the full-duplex communication.

9. The non-transitory computer-readable medium of claim 7, wherein to cause the processor to receive the multiplexed uplink control information transmission the code when executed by the processor further causes the processor to:
receive the multiplexed uplink control information transmission using the first uplink beam associated with the first uplink control information resource based on the second uplink control information resource being for half-duplex communication and the first uplink control information resource being for the full-duplex communication.

* * * * *